(12) United States Patent
Zhao et al.

(10) Patent No.: US 7,376,176 B2
(45) Date of Patent: May 20, 2008

(54) METHOD AND EQUIPMENT FOR REGULATING DYNAMICALLY AN AVERAGE AREA OF A CHANNEL ESTIMATION

(75) Inventors: Chunming Zhao, Jiangsu (CN);
Zhangyong Ma, Jiangsu (CN);
Liangcheng Jiang, Jiangsu (CN);
Xiaohu You, Jiangsu (CN)

(73) Assignees: The Research Institute of Telecommunication Transmission, MII, Beijing (CN); Southeast University, Jiangsu (CN)

( * ) Notice: Subject to any disclaimer, the term of this patent is extended or adjusted under 35 U.S.C. 154(b) by 459 days.

(21) Appl. No.: 10/488,387

(22) PCT Filed: Sep. 3, 2002

(86) PCT No.: PCT/CN02/00605
§ 371 (c)(1),
(2), (4) Date: Sep. 17, 2004

(87) PCT Pub. No.: WO03/021980
PCT Pub. Date: Mar. 13, 2003

(65) Prior Publication Data
US 2005/0018641 A1    Jan. 27, 2005

(30) Foreign Application Priority Data
Sep. 3, 2001    (CN) ................................ 01 1 31224

(51) Int. Cl.
*H04B 1/00* (2006.01)
*H03D 1/04* (2006.01)

(52) U.S. Cl. .................. 375/148; 375/346; 375/150

(58) Field of Classification Search .............. 375/340, 375/346, 347, 148, 316, 142, 140, 147, 150, 375/343, 267, 259, 130, 260
See application file for complete search history.

(56) References Cited

U.S. PATENT DOCUMENTS 6,182,251 B1    1/2001    Rahnema et al.
6,529,850 B2 *    3/2003    Wilborn et al. ............. 702/142
6,647,055 B2 *    11/2003    Kuo ........................... 375/148
6,842,624 B2 *    1/2005    Sarkar et al. ................ 455/522

FOREIGN PATENT DOCUMENTS

| CN | 1312625 | 9/2001 |
| CN | 1332583 | 1/2002 |
| WO | WO 0117185 | 3/2001 |

OTHER PUBLICATIONS

Sakamoto et al, "Adaptive channel estimation with velocity estimator for W-CDMA receiver", May 15-18, 2000, IEEE 51st Vehicular Conference Proceedings, 2000, vol. 3, pp. 2024-2028.*

* cited by examiner

*Primary Examiner*—Mohammed Ghayour
*Assistant Examiner*—Vineeta Panwalkar
(74) *Attorney, Agent, or Firm*—Westman, Champlin & Kelly, P.A.

(57) ABSTRACT

The present invention relates to a method and an apparatus for adjusting an average interval of channel estimation dynamically based on Doppler-shift. The method comprises the steps of estimating Doppler-shift by using level cross rate (LCR) according to differently moving speeds of mobile terminals, determining the optimal average interval of channel estimation based on the relationship between the existing Doppler-shift and the optimal average interval of channel estimation, dynamically adjusting the average interval of channel estimation according to the determined optimal average interval of channel estimation to make the coherent receiver obtain the optimal estimation performance at different moving speeds. The apparatus of the present invention comprises a channel estimation module, a valid/strongest finger selection module, a RAKE demodulation and combining module, a RAKE output decision module, an LCR detection and Doppler-shift estimation module, a Gaussian noise power estimation module, a strongest path signal power estimation module, and an optimal average interval calculation module.

3 Claims, 2 Drawing Sheets

METHOD AND EQUIPMENT FOR REGULATING DYNAMICALLY AN AVERAGE AREA OF A CHANNEL ESTIMATION

CROSS-REFERENCE TO RELATED APPLICATION

This Application is a Section 371 National Stage Application of International Application No. PCT/CN02/00605, filed Sep. 3, 2002 and published as WO 03/021989 on Mar. 13, 2003, not in English the content of which is hereby incorporated by reference in its entirety.

FIELD OF THE INVENTION

This invention relates to CDMA (Code Division Multiple Access) cellular communication field, especially to the technique of dynamically adjusting an average interval of Doppler-shift estimation and channel estimation in WCDMA (Wideband CDMA) and CDMA2000-1×.

DESCRIPTION OF THE PRIOR ART

Compared with FDMA (Frequency Division Multiple Access) and TDMA (Time Division Multiple Access), CDMA has advantages such as large capacity, anti-multipath fading and high frequency band efficiency, and has become the main technology of radio transmission for 3G (third generation) mobile communications. Spread-spectrum signal receivers of CDMA are divided into two types, i.e., coherent receivers and non-coherent receivers. The coherent receiver needs to know the phase information of received signal, while the non-coherent receiver does not, but it requires that the transmitted signal use orthogonal modulation mode. At present, most of receivers adopt coherent receiving mode. This invention mainly focuses on the coherent receiving mode which is predominant in 3G mobile communication standards.

Signal fading exists in the multipath transmission environment of mobile channels. The amplitudes and phases of received signals are time-varying due to the signal fading. In CDMA cellular mobile communication systems, which adopt spread-spectrum technology, the amplitude and phase information of multipath signals can be estimated through receiving the continuous pilot signals with deterministic information. It is therefore possible to achieve multipath diversity and coherent reception. The coherent spread-spectrum receiver that performs diversity process for multipath fading signals is called RAKE receiver. RAKE receivers can perform phase-correction and maximum ratio combining for multipath signals which carry the same information and their fading characteristics are mutually independent, thereby overcoming the multipath fading and improving the received SNR (Signal-to-Noise Ratio).

It is necessary to estimate the time-varying parameters of fading channels so as to perform coherent reception. This process is called channel estimation. The conventional method decorrelates each path of received signals by means of the known pilot symbols respectively, estimates a plurality of sampled values of channel parameters and averages the plurality of sampled values to obtain more accurate channel estimation values. In the case where channel parameters keep constant relatively, larger average interval leads to more accurate channel estimation results. In practice, however, channel parameters change with the Doppler-shift of fading channels. The faster the moving speed of mobile terminal is, the larger Doppler-shift is, and the faster the channel parameters change. In other words, the interval in which channel parameters relatively keep constant changes with the moving speed of the mobile terminal (Doppler-shift). The faster the moving speed is, the smaller the interval is, and vice versa. The existing mobile terminals are hard to apply in different mobile environments if fixed average interval is adopted. According to the requirements of 3G mobile communication system, mobile terminals should be able to adapt to the dynamic change in environment such as from static state to moving state of 500 Kilometers per hour. Therefore, in order to obtain optimal receiving performance, mobile terminals should have the abilities of estimating Doppler-shift and adjusting the average interval of channel estimation dynamically according to Doppler-shift.

SUMMARY OF THE INVENTION

The object of the present invention is to provide a method and an apparatus for adjusting the average interval of channel estimation dynamically based on Doppler-shift estimation, so that the disadvantage, which a fixed average interval is not able to track the speed of a mobile terminal, can be overcome.

The method of the present invention dynamically adjusts the optimal average interval of channel estimation based on Doppler-shift. It estimates Doppler-shift by using level crossing rate (LCR) according to variant moving speeds of a mobile terminal, and then, the optimal average interval of the channel estimation can be determined based on the relationship between existing Doppler-shift and the average interval.

According to an aspect of this invention, a method of dynamically adjusting an average interval of the channel estimation consists of the following steps: calculating the average level crossing rate (LCR); estimating the channel parameters of the effective arriving paths and the envelope signals thereof by using coherent RAKE reception; calculating the average LCR of the envelope signals of effective arriving path, and estimating the Doppler-shift of channels accordingly; calculating the optimal average interval of channel estimation under current channel environments according to the relationship between the existing Doppler-shift and the optimal average interval of channel estimation; dynamically adjusting the average interval of channel estimation according to the calculated the optimal average interval of channel estimation to make the coherent receiver obtain the optimal estimation performance at different moving speeds.

According to another aspect of this invention, an apparatus for dynamically adjusting an average interval of channel estimation comprises a channel estimation module; a valid/strongest finger selection module; a RAKE demodulating and combining module; a RAKE output decision module; an LCR detecting and Doppler estimating module; a Gaussian noise power estimating module; a strongest path signal power estimating module; and an optimal average interval calculating module.

DESCRIPTION OF THE DRAWINGS

Other advantages and features of the present invention will become readily apparent from the following detailed description of the invention and the embodiments thereof, from the accompanying drawings, in which.

DETAILED DESCRIPTION OF THE PREFERRED EMBODIMENT

Figure 1:
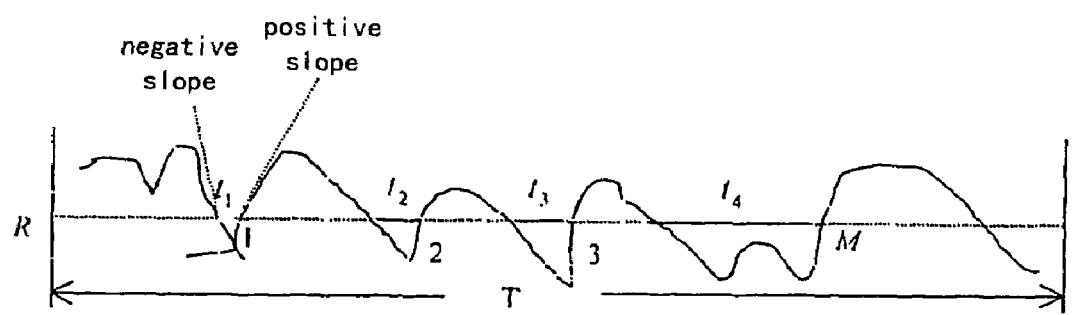
FIG. 1 is a timing chart illustrating the level crossing rate (LCR) and the duration of average level.

Firstly, Doppler-shift estimation of CDMA systems in a multipath fading channel environment is described. It is well known from the fading characteristics of wireless channels that the fading rate is relative to the fading depth. The number of times which occur deep-fading is relatively low, and the number of times which occur shallow-fading is quite frequent. Level crossing rate (LCR) quantitatively describes the parameters of this characteristic. Level crossing rate indicates the average number of times which the signal envelop crosses a certain specified level with positive (or negative) slope within a time unit. As shown in FIG. 1, in the fixed interval T, the received signal envelope crosses the average level R with positive slope at the time points 1, 2, 3, . . . , and M, i.e. the rate of the signal level below R is M because of channel fading. The LCR is $N_A$=M/T. In the case where the observation interval is long enough, Doppler-shift resulting from the channel fading can be estimated from equation 1 as follows:

$$f_d \approx M/T \quad \text{(Equation 1)}$$

where $f_d$ represents Doppler-shift.

Figure 2:
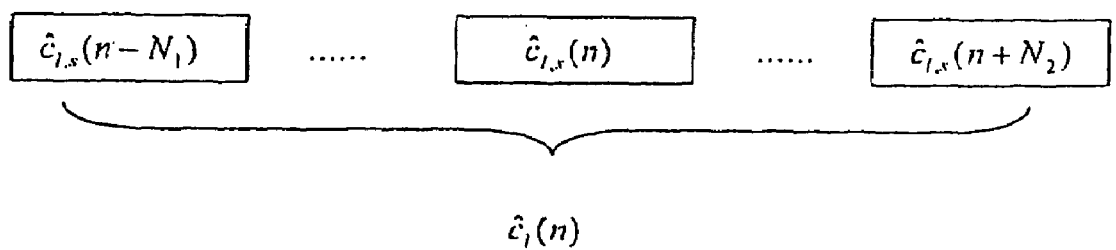
FIG. 2 is a schematic diagram illustrating the average channel estimation based on the moving average window.

In coherent reception of the CDMA system, the continuous pilot channel which is used to transmit the known pilot sequence in advance can be used for system timing, carrier extraction, channel estimation, handover, etc. It is assumed that the total number of effective arriving paths (fingers) which can be distinguished by a RAKE receiver of CDMA system is L, after the received signal passes the RAKE receiver, the output signal of the lth finger after the despreading operation is from equation 2 as follow:

$$\gamma_l(n) = d_p(n)c_l(n) + v(n) \quad \text{(Equation 2)}$$

where $r_l(n)$ is the output signal of the lth finger, $d_p(n)$ is the transmitted pilot symbol, $c_l(n)$ is the channel parameter of the nth symbol in the ith finger, v(n) is complex Additive White Gaussian Noise (AWGN). Based on the pilot symbols, the estimated channel parameter sequence is:

$$\hat{c}_{l,s} = \gamma_l(n) d_p^*(n)/|d_p(n)|^2 = c_l(n) + z(n) \quad \text{(Equation 3)}$$

where $\hat{c}_{l,s}(n)$ is the estimated instantaneous channel coefficient of $c_l(n)$, z(n) is the estimated white noise introduced by v(n), the variance of z(n) is obtained by averaging above symbol instantaneous estimating value by $\sigma_n^2$ with window sliding, as shown in FIG. 2. It is assumed that the window length is P, the more accurate estimated values for channel parameters can be then obtained as follows.

$$\hat{c}_l(n) = \frac{1}{P} \sum_{i=-N_1}^{N_2} \hat{c}_{l,s}(n-i) \quad \text{(Equation 4)}$$

in equation 4, $P = N_1 + N_2 + 1$ is the window length for moving averaging, whose initial value should keep the instantaneous channel estimation value, $\hat{c}_{l,s}(n-i), -N_1 \leq i \leq N_2$, to be a constant relatively.

It is necessary to calculate the average level of its channel estimation in order to calculate the Doppler-shift of the ith finger of RAKE receiver. Therefore, the envelop average value of $\hat{c}_l(n)$ is continuously sampled for K times as the required average level estimation value:

$$\hat{R}_l(n) = \frac{1}{K} \sum_{i=0}^{K} |\hat{c}_l(n-i)| \quad \text{(Equation 5)}$$

or $$\hat{R}_l(n) = \hat{R}_l(n-1) + \frac{1}{K}\{|\hat{c}_l(n)| - |c_l(n-K)|\}$$

where value K in the equation 5 should be large enough to make the corresponding observation length far more larger than the channel fading period. It is assumed that the time period to which the K continuous $\hat{c}_l(n)$ correspond is T, and the number of times which the envelop $|\hat{c}_l(n)|$ for channel estimation of the ith path upwardly crosses the average level $\hat{R}_l(n)$ is $M_l(n)$ times, thus, the estimated Doppler-shift $\hat{f}_{d,l}(n)$ for the ith finger of the RAKE receiver is calculated from equation (6) as follows.

$$f_{d,l}(n) \approx M_l(n)/T \quad \text{(Equation 6)}$$

After that, the optimal average interval of channel estimation under current channel conditions such as Doppler-shift and noise is calculated with the relationship between existing Doppler-shift and average interval of the optimal average interval of channel estimation. If Doppler-shift is $\hat{f}_{d,l}$, the is pilot symbol duration is $T_S$, the variance of Gaussian White Noise is $\sigma_n^2$ and the power for the lth arriving path is $\sigma_l^2$, the optimal average interval of channel estimation is then calculated based on the following equation.

$$P = \sqrt[5]{(384\sigma_l^2/((2\pi f_d T_s)^4 \sigma_n^2)} \quad \text{(Equation 7)}$$

Since the transmitted data is performed simultaneously with the code channels, which are parallel with the pilot channel, the channel fading parameters are the same as the those estimated by the pilot channel. After despreading, the lth finger output of the received data channel can be given in equation (8)

$$r_l^d(m) = d(m)c_l(n) + v(m), \ m = qn+j, \ j=0,1,\Lambda,q-1 \quad \text{(Equation 8)}$$

where d(m) is the transmitted symbol and q is the number of the trasnmitted symbols included in a pilot symbol duration. The maximum ratio combining output of a RAKE receiver is then obtained as follows:

$$\hat{d}(m) = \sum_{l=1}^{L} r_l^d(m)\hat{c}_l^*(n) \quad \text{(Equation 9)}$$

The variance $\sigma_n^2$ of Gaussian White Noise and the signal power $\sigma_l^2$ of the ith path can be estimated respectively from above equations as follows.

$$\hat{\sigma}_n^2(m) = \frac{1}{qK} \sum_{i=0}^{qK-1} \left| r_l^d(m-i) - \hat{d}(m-i)\hat{c}_l(n-k) \right|^2, k = \lfloor i/q \rfloor \quad \text{(Equation 10)}$$

or $$\hat{\sigma}_n^2(m) = \hat{\sigma}_n^2(m-1) + \frac{1}{qK}$$
$$\left\{ \left| r_l^d(m) - \hat{d}(m)\hat{c}_l(n) \right|^2 - \left| r_l^d(m) - \hat{d}(m-qK)\hat{c}_l(n-K) \right|^2 \right\}$$

$$\hat{\sigma}_l^2(n) = \frac{1}{K} \sum_{i=0}^{K-1} |\hat{c}_l(n-i)^2| \quad \text{(Equation 11)}$$

or $$\hat{\sigma}_l^2(n) = \hat{\sigma}_l^2(n-1) + \frac{1}{K}\{|\hat{c}_l(n)|^2 - |\hat{c}_l(n-K)|^2\}$$

Then, the average interval of channel estimation is dynamically adjusted based on the calculated optimal average interval of channel estimation. This enables the coherent receivers to obtain the optimal estimating performance at different moving speeds. For the $l^{th}$ finger of channel estimator, 0 1 L−1, the optimal average interval of channel estimation is iteratively performed based on the following method:

Step 1: Initiating the parameters, and setting the initial value of average interval parameter as $P=P_0$. The iteration number is n=1;

Step 2: Calculating the instantaneous channel estimation $\hat{c}_{l,s}(n)$ to which each pilot symbol corresponds and setting $P=P_{n-1}$, calculating the average channel estimation of a sliding window $\hat{c}_l(n)$ according to equation (4), and then calculating the average level $\hat{R}_l(n)$ according to equation (5);

Step 3: Counting statistics for average channel estimation $\hat{c}_l(n-i)$, where 0 i K−1 in K estimation areas (i.e. T time interval) and the times for up-cross average level A, (n) that $\hat{c}_l(n-i)$ corresponds to, where 0 i K−1; and estimating Doppler-shift $\hat{f}_{d,l}(n)$ of mobile station according to (equation 6):

Step 4: Calculating the variance of Gaussian White Noise $\sigma_n^2$ as well as the estimated value for the signal power $\sigma_n^2$ of the ith path according to equation (10) and equation (11) respectively, and calculating the optimal average length $P_n$ of the channel estimator when Doppler-shift is $\hat{f}_{d,l}(n)$ according to equation (7); n←n−1, and then returning back to Step 2.

The iteration method described above is performed on the ith path of the RAKE receiver. Since the effects of Doppler-shift caused by mobile terminals on the arriving path for each channel are the same, The iteration method described above can be simplified to determine the optimal average interval of channel estimation of all L pathes only by using the strongest signal arriving path.

Figure 3:
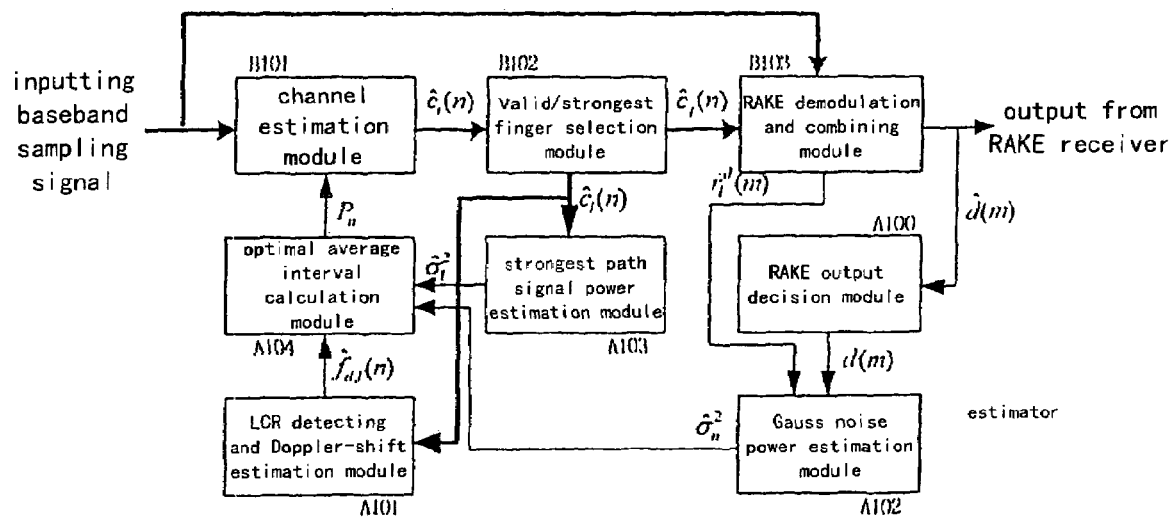
FIG. 3 is a block diagram illustrating the RAKE receiver of cdma2000-1× system based on the principle of LCR according to an embodiment of the invention.

The advantages of this invention are given as follows:

The method and the apparatus of the present invention can be easily achieved by adding a RAKE output decision module A100, an LCR detection and Doppler-shift estimation module A101, a Gaussian noise power estimation module A102, a strongest path signal power estimation module A103, and an optimal average interval calculation module A104 to a conventional RAKE receiver which is composed of a channel estimation module B101, a valid/strongest finger selection module B102 and a RAKE demodulation and combination module B103 (referring to FIG. 3). The dynamic adjusting apparatus according to the present invention can be used in any CDMA mobile communication system with continuous pilot channel, including 3GPP WCDMA and 3GPP2 cdma2000 systems. Further, the application of the present invention can make RAKE receivers achieve optimal performance at different moving speeds. The change of channels can be automatically traced when the moving speed is changed. Furthermore, an optimal average length can be selected within the estimated speed range to improve the system performance to a large extent.

The invention will be described in detail based on the following embodiments with reference to the attached drawings which do not intend to limit the scope of the present invention.

Referring to FIG. 1, a schematic diagram illustrating the signal envelop crossing the level R is shown. Level Crossing Rate (LCR) indicates the average number of times for signal envelop to cross the level R with positive slope, for example, the point which the positive slope intersects with the level R as shown by referring sign 1 in FIG. 1, within a unit of time T.

FIG. 2 illustrates the average channel estimation based on window sliding.

The method according to this invention can be applied to any CDMA mobile communication systems with continuous pilot channel, including 3GPP (The Third Generation Partnership Project) WCDMA and 3GPP2 (The Third Generation Partnership Project 2) cdma2000 systems.

The apparatus according to the present invention can be implemented by adding a RAKE output decision module, an LCR detection and Doppler-shift estimation module, a Gaussian noise power estimation module, a strongest path signal power estimation module, and an optimal average interval calculation module, i.e., five computing units, to a conventional RAKE receiver.

FIG. 3 is a block diagram illustrating a RAKE receiver in cdma2000-1x system based on LCR principle according to an embodiment of this invention. The configuration of the apparatus to which the method of this invention is applied is shown in detail in this figure. As shown in FIG. 3, the RAKE receiver of the invention comprises a channel estimation module B101, a valid/strongest finger selection module B102, a RAKE demodulation and combination module B103, a RAKE output decision module A100, an LCR detection and Doppler-shift estimation module A101, a Gaussian noise power estimation module A102, a strongest finger signal power estimation module A103, and an optimal average interval calculation module A104. The channel estimation module B101 receives the baseband sampling signals and performs the correlation operation. The valid/strongest finger selection module B102 selects the effective signal arriving path and the strongest signal arriving path according to the amplitude of the channel estimation module B101. The RAKE demodulation and combination module B103 receives the baseband sampling signal and performs the correlation operation. The RAKE output decision module A100 receives the output from the RAKE demodulation and combination module B103 and performs hard-decision on the output from the RAKE receiver. The LCR detection and Doppler-shift estimation module A101 receives the output from the valid/strongest finger selection module B102 and calculates the average level of the signals from this finger. The Gaussian noise power estimation module A102 calculates the noise power included in the strongest signal arriving finger. The strongest path signal power estimation module A103 receives the strongest finger channel estimation resulting from the valid/strongest finger selection module B102. The optimal average interval calculation module A104 adjusts the average interval of channel estimator.

As shown in FIG. 3, the valid/strongest finger selection module B102 connects to the LCR detection and Doppler-shift estimation module A101 and to the strongest finger signal power estimation module A103 respectively. The RAKE demodulation and combination module B103 connects to the Gaussian noise power estimation module A102 and the RAKE output decision module A100 respectively.

The operation of apparatus according to the present invention will be described in detail as follows. Firstly, the received baseband analog signals are A/D converted to digital signals, and the converted digital signals are input into the channel estimation module B101. The channel estimation module B101 receives the digital baseband sampling signals and then performs the correlation operation. That is, the channel estimation module B101 estimates the instantaneous channel parameter $\hat{c}_{l,s}(n)$ according to equation (3) and calculates the sliding average channel estimation value $\hat{c}_l(n)$ according to equation (4), where l=0, 1, ..., L−1, and value L should be larger than the multipath fading delay spread. Thus, multipath fading channels can be estimated. For cdma2000-1× systems, the selection of the value L is 32. At the beginning of the iteration, the selection of the average length P may be 4 symbols (i.e., 256 chips), and the iterated result is sent to the valid/strongest finger selection module B102. The valid/strongest finger selection module B102 selects the effective signal arriving finger and the strongest signal arriving finger according to the amplitude of the channel estimating value $c_l(n)$ from the channel estimation module B101. The strongest signal arriving finger is used to determine the, following average level, LCR, the power of the arriving signal path and the noise power so that the value of path 1 can be calculated as needed. The effective signal arriving path is used to the calculation of the following RAKE combination. The valid/strongest finger selection module B102 send the selected effective signal arriving path and the strongest signal arriving path to the RAKE demodulation and combination module B103, the strongest finger signal power estimation module A103 and the LCR detection and Doppler-shift estimation module A101. The RAKE demodulation and combination module B103 receives the baseband sampling signals and performs the correlation operation to obtain the demodulation output expressed as follows, $$r_l^d(m) = d(m)c_l(n) + v(m), \quad m = qn+j, \; j=0,1,\Lambda,q-1$$

Then, the maximum ratio combining is performed according to equation (9) so that the output from the RAKE receiver is obtained. On the other hand, the demodulation output from the strongest finger and the output decision from the RAKE receiver are sent to the Gaussian noise power estimation module A102. The RAKE output decision module A100 receives the output from the RAKE demodulation and combination module B103 and performs hard-decision on the output from the RAKE receiver and, obtains the judgment estimation value d(m) of the transmitted data symbol. Then, the result is supplied to the Gaussian noise power estimation module A102. The LCR detection and Doppler-shift estimation module A101 receives the output from the valid/strongest finger selection module B102, and calculates the average level $\hat{R}_l(n)$ of the path signal according to equation (5), and carries out the level crossing rate detection as shown in FIG. 1. Furthermore, The LCR detection and Doppler-shift estimation module A101 counts the number of times which the envelop upwardly crosses the average level $\hat{R}_1(n)$ within the time intervals of continuous K of $\hat{c}_1(n-i)S$; and then calculates the estimation value $\hat{f}_{d,l}(n)$ of Doppler-shift according to equation (6); and sends the result to the optimal channel estimation average interval calculation module A104. The Gaussian noise power estimation module A102 receives the demodulation output of the strongest finger signal from the RAKE demodulation and combination module B103 and the output from the RAKE output decision module A100, and calculates the noise power included in the strongest signal arriving finger. That is, the Gaussian noise power estimation module A102 calculates the noise power estimation $\hat{\sigma}_I^2$ of the strongest finger signal according to equation (10), and sends the result to the optimal average interval calculation module A104. The strongest finger signal power estimation module A102 receives the strongest finger channel estimation result from the valid/strongest finger selection module B102, calculates the strongest finger power estimation $\hat{\sigma}_I^2$ according to equation (11) and sends the result to the optimal average interval calculation module A104. The optimal average interval calculation module A104 receives the outputs from the LCR detection and Doppler-shift estimation module A101, the Gaussian noise power estimation module A102 and the strongest finger signal power estimation module A103 respectively, and selects the optimal average interval according to equation (7), and sends the result to the channel estimation module B101, thereby the average interval length P of the channel estimator is adjusted.

Figure 4:
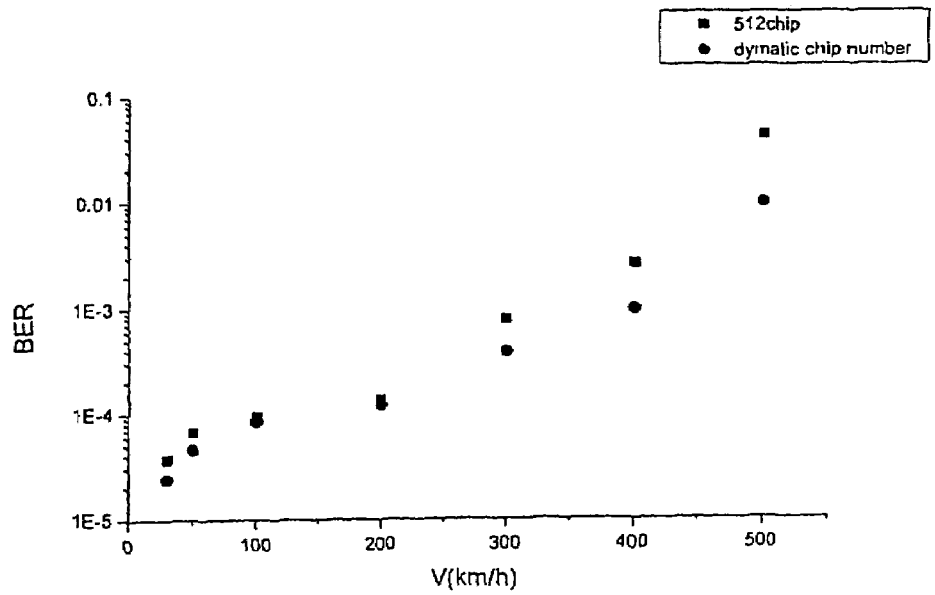
FIG. 4 is a schematic diagram illustrating the comparison of the performance between fixed average interval and dynamic average interval used at different moving speeds.

FIG. 4 shows a typical calculation result which the average interval of channel estimation is dynamically adjusted in a mobile terminal used for 3GPP2 cdma2000-1× systems. The channel model adopted here is the M. 1225 urban channel model as recommended by ITU-R, the calculation parameters thereof are given as follows: $E_b/N_0$=3 dB; data transmission rate is 9.6 kbps; carrier frequency is 800 MHz frequency as recommended by 3GPP2 standard. As shown in FIG. 4, if a fixed average interval (512 chips) with 5 pilot symbols is used, a good performance can be obtained within the range which the equivalent moving speed is from 100 km/h to 200 km/h. If channel estimation average interval to which dynamic adjustment is applied is used, the overall performance of the RAKE receivers can be optimized all the time, and the RAKE receivers may adapt to different moving speeds. In general, when the speed is less than 100 km/h, the optimal average interval is from 8 to 16 symbols (from 512 to 1024 chips). When the speed is changed within the range from 100 km/h to 300 km/h, the optimal average interval is 8 symbols (512 chips). When the speed is larger than 300 km/h, the optimal average interval is from 4 to 6 symbols (from 384 to 256 chips).

Although the present invention has been described by means of exemplary embodiments, it should be understood that many changes and substitutions may further be made by those skilled in the art without departing from the scope of the present invention which is defined by the appended claims.

What is claimed is:

1. A method for dynamically adjusting an average interval length of channel estimation, comprising the steps of:

receiving baseband sampling signals and performing a correlation operation to estimate an instantaneous channel parameter and calculate a sliding average estimation value;

selecting an effective signal arriving path and a strongest signal arriving path according to amplitude of the calculated sliding average estimation value;

receiving the baseband sampling signals and performing the correlation operation to obtain a demodulation output in a RAKE demodulation and combining module;

receiving the demodulation output from the RAKE demodulation and combining module and performing a hard-decision on the output from a RAKE receiver to obtain a judgment estimation value of transmitted data symbols;

calculating an average level of the signals selected from the selected effective signal arriving path and the strongest signal arriving path to calculate the average level of the path signal and a detect level crossing rate;

calculating noise power included in the strongest signal arriving path based on the demodulation output and the judgment estimation value of the transmitted data symbols;

calculating a strongest path power estimation based on the calculated sliding average channel estimation value;

dynamically adjusting the average interval length of the channel estimation by selecting an optimal average interval based on the detected level crossing rate, the calculated noise power and the calculated strongest path power estimation.

2. The method dynamically adjusting the average interval of a channel estimation according to claim 1, wherein the step of selecting the optimal average interval of channel estimation further comprises:

step 1: initiating the parameters, and setting an initial value of average interval parameter as $P=P_0$, number of iteration is $n=1$;

step 2: calculating instantaneous channel estimation $\hat{c}_{l,s}(n)$ to which each pilot symbol corresponds and setting $P=P_{n-1}$, calculating average channel estimation of a sliding window $\hat{c}_{l,s}(n)$ using the equation expressed as follows $$\hat{c}_l(n) = \frac{1}{P} \sum_{i=-N_1}^{N_2} \hat{c}_{l,s}(n-i)$$

and calculating the average level $\hat{R}_l(n)$ using the following equation $$\hat{R}_l(n) = \frac{1}{K} \sum_{i=0}^{K} |\hat{c}_l(n-i)|$$

or $$\hat{R}_l(n) = \hat{R}_l(n-1) + \frac{1}{K} \{|\hat{c}_l(n)| - |c_l(n-K)|\};$$

step 3: calculating statistics for average channel estimation $\hat{c}_l(n-i)$, where $0<i<K-1$ in K estimation intervals (i.e. T time interval) and the times for up-cross average level $\hat{R}_l(n)$ that $\hat{c}_l(n-i)$ corresponds to, where $0<i<K-1$ and estimating Doppler-shift $\hat{f}_{d,l}(n)$ of mobile station according to following equation:

$$f_{d,l}(n) \approx M_1(n)/T;$$

step 4: calculating variance of Gaussian White Noise $\sigma_n^2$ with the following equation $$\hat{\sigma}_n^2(m) = \frac{1}{qK} \sum_{i=0}^{qK-1} |r_l^d(m-i) - \hat{d}(m-i)\hat{c}_l(n-k)|^2, k = \lfloor i/q \rfloor$$

or $$\hat{\sigma}_n^2(m) =$$

$$\hat{\sigma}_n^2(m-1) + \frac{1}{qK} \{|r_l^d(m) - \hat{d}(m)\hat{c}_l(n)|^2 |r_l^d(m) - \hat{d}(m-qK)\hat{c}_l(n-K)|^2\}$$

and calculating the estimated value for the signal power $\sigma_l^2$ of the lth path with the following equation $$\hat{\sigma}_l^2(n) = \frac{1}{K} \sum_{i=0}^{K-1} |\hat{c}_l(n-i)|^2$$

or $$\hat{\sigma}_l^2(n) = \hat{\sigma}_l^2(n-1) + \frac{1}{K} \{|\hat{c}_l(n)|^2 - |\hat{c}_l(n-K)|^2\}$$

and calculating the optimal average length $P_n$ of the channel estimator when Doppler-shift is $\hat{f}_{d,l}(n)$ with the following equation $$P = \sqrt[5]{384\sigma_l^2 / ((2\pi f_d T_s)^4 \sigma_n^2)},$$

$n \leftarrow n-1$, and then returning back to Step 2.

3. An apparatus for dynamically adjusting an average interval length of channel estimation, comprising:

a channel estimation module for receiving baseband sampling signals and performing a correlation operation to estimate an instantaneous channel parameter and calculate a sliding average channel estimation value;

a valid/strongest finger selection module for selecting an effective signal arriving path and a strongest signal arriving path according to amplitude of the calculated sliding average channel estimation value;

a RAKE demodulation and combining module for receiving the baseband sampling signals and performing the correlation operation to obtain a demodulation output;

receiving a RAKE output decision module for receiving the demodulation output from the RAKE demodulation and combining module and performing a hard-decision on the output from a RAKE receiver to obtain a judgment estimation value of transmitted data symbols;

a level crossing rate detection and Doppler-shift estimation module for calculating an average level of the signals from the selected effective signal arriving path and the strongest signal arriving path to calculate the average level of the path signal and a detect level crossing rate;

a Gaussian noise power estimation module for calculating noise power included in the strongest signal arriving path based on the demodulation output and the judgment estimation value of the transmitted data symbols;

a strongest path signal power estimation module for calculating strongest path power estimation based on the calculated sliding average channel estimation value;

an optimal average interval calculation module for dynamically adjusting the average interval length of the channel estimation by selecting the optimal average interval based on the detected level crossing rate, the calculated noise power and the calculated strongest path power estimation.

* * * * *